H. T. COLDWELL.
TRACTION AND LAWN ROLLING ROLLER.
APPLICATION FILED MAY 19, 1909.
933,292.
Patented Sept. 7, 1909.
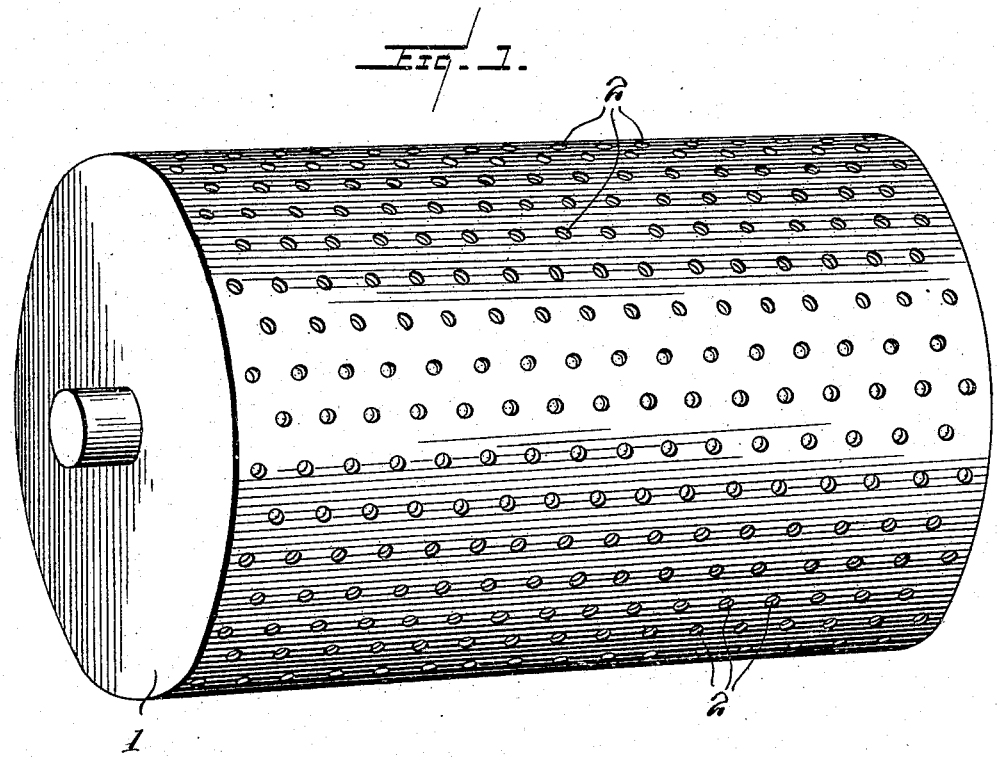
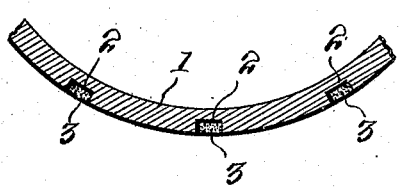
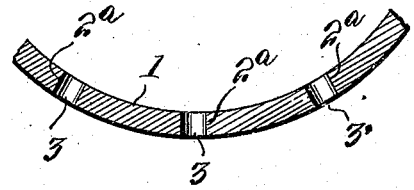

UNITED STATES PATENT OFFICE.

HARRY T. COLDWELL, OF NEWBURGH, NEW YORK.

TRACTION AND LAWN-ROLLING ROLLER.

933,292.

Specification of Letters Patent. Patented Sept. 7, 1909.

Application filed May 19, 1909. Serial No. 497,064.

*To all whom it may concern:*

Be it known that I, HARRY T. COLDWELL, citizen of the United States, residing at Newburgh, in the county of Orange and State of New York, have invented certain new and useful Improvements in Traction and Lawn-Rolling Rollers; and I do hereby declare the following to be a full, clear, and exact description of the invention, such as will enable others skilled in the art to which it appertains to make and use the same.

My invention consists in the novel features hereinafter set forth reference being had to the accompanying drawing which illustrates the best form in which I have contemplated embodying my invention and said invention is fully disclosed in the following description and claims.

In the use of motor propelled lawn mowers and rollers, difficulty is experienced at times in securing the desired traction of the rollers upon the surface traversed and especially when the lawn is wet, or again when it is hard and dry. It is extremely desirable to provide the roller or rollers with some means for increasing the traction and which will also prevent the roller or rollers from slipping sidewise when operating on an inclined surface. The various means heretofore resorted to in connection with the traction wheels or rollers of traction engines, and other road vehicles cannot be used in a lawn mower or roller, for the obvious reason that they would cut up or mark a lawn.

Motor lawn mowers, are used very extensively as rollers, both while actually cutting grass and without operating the cutting mechanism, and these motor lawn mowers or rollers are used advantageously in rolling tennis courts, many of which are not provided with sod. It is apparent, therefore, that it is very desirable to avoid the use of any traction increasing means which involves a projection or projections from the peripheral surface of the traction rollers, as a roller provided with any kind of projecting devices would be prohibited from a "dirt" tennis court.

The object of my present invention is to provide means for increasing the traction of the rollers of a motor lawn mower or roller, and at the same time to avoid any projections from the surface thereof, so that the machines provided with my improved roller can be effectively used both on a lawn and upon a "dirt" tennis court, or other smooth rolled sodless surface, such as a roque court, etc.

In the drawing, Figure 1 represents a perspective view of a combined traction and lawn rolling roller, embodying my invention, before the recesses therein are filled. Fig. 2 is an enlarged partial section of the same. Fig. 3 is a similar view showing a slight modification.

In carrying out my invention I provide the peripheral surface of the traction, lawn rolling and court rolling roller, with a plurality of comparatively small recesses (or apertures) dispersed over the whole peripheral surface of the roller, and separated from each other in all directions. Thus in the drawing 1 represents the roller and 2, the recesses, which as shown in Figs. 1 and 2 are circular in cross section and extend only part way through the shell or wall of the roller. The said recesses may, however, be of any preferred shape and may extend all the way through the shell or wall of the roller as shown at $2^a$ in Fig. 3. These recesses or apertures are to be filled with a substance having a greater tractive quality than the surface of the roller itself, and I may employ for this purpose any suitable material 3, such as cork, concrete, clay, rubber, wood, dirt, etc., it being understood that the contents of said recesses or apertures do not extend beyond, but on the contrary lie flush with the surface of the roller. The recesses or apertures may be given any desired form which will tend to lock and retain the friction material in its place, as for example, making the recesses 2 wider at the bottom, and the apertures $2^a$ widest in the center between the inner and outer surfaces of the roller wall. I conveniently fill these said recesses or apertures by operating the machine over some surface like an ordinary roadway and allowing them to become filled with dirt, which will pack therein and harden. The road may be sprinkled slightly to facilitate the packing of the recesses before the roller is taken onto a lawn or tennis court. It will be seen that in the operation of this form of roller the friction of the dirt or filling of the apertures upon the surface of a lawn will increase the normal traction of the roller and without in the least marring the lawn, and the machine can be used to roll a tennis or other dirt court without marking or roughening it in the least. I may in some cases, use the roller 1 without filling said recesses, upon a lawn, but in such case the recesses would quickly become filled with grass and dirt which would provide the flush frictional surface.

In the following claims I have used the term "apertures" as covering either a recess which extends partly through the wall of the roller, as shown in Fig. 2, or an aperture which extends entirely through the same, as shown in Fig. 3.

What I claim and desire to secure by Letters Patent is:—

1. A traction lawn and court rolling roller, having a plain cylindrical surface, provided with apertures separated from each other in all directions, whereby said apertures will become filled with foreign matter, and provide a plurality of friction spots flush with the surface of the roller.

2. A traction lawn and court rolling roller, having a plain cylindrical surface, provided with a plurality of friction surfaces, flush with the surface of the roller and separated from each other in all directions.

3. A traction lawn and court rolling roller, having a plain cylindrical surface, provided with apertures separated from each other in all directions, and a filling of material having greater frictional resistance than the surface of the roller, located in said apertures and having its outer surface flush with the other portions of the surface of the roller.

In testimony whereof I affix my signature, in the presence of two witnesses.

HARRY T. COLDWELL.

Witnesses:
H. W. MURTFELDT,
MYRON S. EMBLER.